United States Patent
Lai et al.

(10) Patent No.: US 11,297,320 B2
(45) Date of Patent: Apr. 5, 2022

(54) SIGNALING QUANTIZATION RELATED PARAMETERS

(71) Applicant: MEDIATEK INC., Hsinchu (TW)

(72) Inventors: Chen-Yen Lai, Hsinchu (TW);
Chih-Wei Hsu, Hsinchu (TW);
Tzu-Der Chuang, Hsinchu (TW);
Ching-Yeh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/143,823

(22) Filed: Jan. 7, 2021

(65) Prior Publication Data

US 2021/0218966 A1    Jul. 15, 2021

Related U.S. Application Data

(60) Provisional application No. 62/962,077, filed on Jan. 16, 2020, provisional application No. 62/959,694, filed on Jan. 10, 2020.

(51) Int. Cl.
| | |
|---|---|
| *H04N 19/00* | (2014.01) |
| *H04N 19/124* | (2014.01) |
| *H04N 19/96* | (2014.01) |
| *H04N 19/184* | (2014.01) |

(52) U.S. Cl.
CPC ......... *H04N 19/124* (2014.11); *H04N 19/184* (2014.11); *H04N 19/96* (2014.11)

(58) Field of Classification Search
CPC ...... H04N 19/176; H04N 19/70; H04N 19/18; H04N 19/184; H04N 19/124; H04N 19/96
See application file for complete search history.

(56) References Cited

U.S. PATENT DOCUMENTS

| | | | |
|---|---|---|---|
| 2019/0387259 A1* | 12/2019 | Coban | H04L 1/0063 |
| 2021/0144384 A1* | 5/2021 | Sjoberg | H04N 19/70 |
| 2021/0204000 A1* | 7/2021 | Wang | H04N 19/96 |

* cited by examiner

*Primary Examiner* — Zhihan Zhou
(74) *Attorney, Agent, or Firm* — Oblon, McClelland, Maier & Neustadt, L.L.P.

(57) ABSTRACT

A video decoder parses a sequence parameter set (SPS) that is applicable to a current sequence of video pictures that includes the current picture, the SPS comprises a first dependent quantization flag and a first sign hiding flag. When the first dependent quantization flag indicates that dependent quantization is enabled for the current sequence, the decoder parses a second dependent quantization flag for indicating whether dependent quantization is used for quantizing the one or more slices of the current picture. When the second dependent quantization flag indicates that dependent quantization is not used for one or more slices of the current picture and the first sign hiding flag indicates that sign hiding is enabled for the current sequence, the decoder parses a second sign hiding flag for indicating whether sign hiding is used for quantizing the one or more slices of the current picture.

14 Claims, 10 Drawing Sheets

| Current State | next state for... | |
|---|---|---|
| | (k&l)==0 | (k&l)==1 |
| 0 | 0 | 2 |
| 1 | 2 | 0 |
| 2 | 1 | 3 |
| 3 | 3 | 1 |

SIGNALING QUANTIZATION RELATED PARAMETERS

CROSS REFERENCE TO RELATED PATENT APPLICATION(S)

The present disclosure is part of a non-provisional application that claims the priority benefit of U.S. Provisional Patent Application No. 62/959,694 and No. 62/962,077, filed on 10 Jan. 2020 and 16 Jan. 2020, respectively. Contents of above-listed applications are herein incorporated by reference.

TECHNICAL FIELD

The present disclosure relates generally to video coding. In particular, the present disclosure relates to methods of signaling transform and quantization related parameters.

BACKGROUND

Unless otherwise indicated herein, approaches described in this section are not prior art to the claims listed below and are not admitted as prior art by inclusion in this section.

In a video coding system implementing High-Efficiency Video Coding (HEVC), the input video signal is predicted from the reconstructed signal, which is derived from the coded picture regions. The prediction residual signal is processed by a linear transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for output and for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit includes a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma. In some other coding standards, each CTU can be partitioned into one or multiple smaller size coding units (CUs) by a quadtree with nested multi-type tree using binary and ternary split. The resulting CU partitions can be in square or rectangular shapes.

In order to achieve uniform quantization across spatial frequencies, a quantization matrix (QM) weights each frequency channel associated with the transform coefficient according to the perceived sensitivity over its related frequency range such that lower frequency coefficients in the transform block are quantized in finer quantization step sizes than higher frequency coefficients. At the decoder, a corresponding quantization matrix inversely weighs the de-quantized transform coefficients of each frequency channel. Quantization matrix has been successfully utilized in various video coding standards, such as H.264/AVC (Advanced Video Coding) and H.265/HEVC (High Efficiency Video Coding) and in numerous commercial products, in order to improve the subjective quality of video content.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for signaling or parsing quantization related parameters. In some embodiments, a video decoder receives data from a bitstream to be decoded as a current picture comprising one or more slices. The decoder parses a sequence parameter set (SPS) from the bitstream that is applicable to a current sequence of video pictures that includes the current picture, the SPS comprises a first dependent quantization flag and a first sign hiding flag. When the first dependent quantization flag indicates that dependent quantization is enabled for the current sequence, the video decoder parses a second dependent quantization flag from the bitstream for indicating whether dependent quantization is used for quantizing the one or more slices of the current picture. When the second dependent quantization flag indicates that dependent quantization is not used for one or more slices of the current picture and the first sign hiding flag indicates that sign hiding is enabled for the current sequence, the video decoder parses a second sign hiding flag from the bitstream for indicating whether sign hiding is used for quantizing the one or more slices of the current picture. The video decoder reconstructs the current picture based on dequantized transform coefficients of the one or more slices of the current picture based on whether dependent quantization is used and whether sign hiding is used.

When sign hiding is used for quantizing the one or more slices of the current picture, a sign bit of a first non-zero transform coefficient of a coefficient subset in the one or more slices is determined based on a parity of a sum of all nonzero coefficients in the coefficient subset. When dependent quantization is used for the one or more slices of the current picture, a current transform coefficient in the one or more slices of the current picture is limited to a set of admissible (reconstruction) values that are determined based on transform coefficients that precede the current transform coefficient in reconstruction order according to a trellis structure. The transform coefficients of the one or more slices are quantized by a scaler quantizer that is determined by parities of the transform coefficients that precede the current transform coefficient in reconstruction order.

In some embodiments, only one of dependent quantization and sign hiding is enabled for the one or more slices of the current picture. In other words, dependent quantization and sign hiding are exclusively signaled in the bitstream. In some embodiments, the first dependent quantization flag and the first sign hiding flag are exclusively signaled in the SPS, and the first sign hiding flag is not signaled in the SPS and inferred to disable sign hiding when the first dependent quantization flag is explicitly signaled in the SPS to enable dependent quantization.

In some embodiments, the second dependent quantization flag is signaled in a picture header that is applicable to the one or more slices of the current picture. In some embodiments, the second sign hiding flag is signaled in a picture header that is applicable to the one or more slices of the current picture. In some embodiments, when the second dependent quantization flag indicates that dependent quantization is used for one or more slices of the current picture, the decoder infers sign hiding is to be disabled for the one or more slices of the current picture and does not parse the second sign hiding flag.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Sign Data Hiding

Sign data hiding (or sign bit hiding or sign hiding) is a bit-rate reduction technique used when quantizing transform coefficients. Specifically, a sign bit of a first non-zero transform coefficient of a coefficient subset (e.g., a 4×4 coding group of transform coefficients) is inferred based on a parity of a sum of all nonzero coefficients in the coefficient subset rather than explicitly signaled in the bitstream.

In some embodiments, a sign hiding technique is applied as follows: If the 4×4 coefficient subset satisfies a certain condition, the sign bit (e.g., coeff_sign_flag) of the first nonzero coefficient (of the 4×4 coefficient subset) is not coded, and the decoder infers the sign bit from the parity of the sum of all nonzero coefficients in that coefficient subset. (For some coding standards, the syntax element coeff_sign_flag[n] specifies the sign of a transform coefficient level for a scanning position n in the coefficient subset.)

In HEVC, the sign hiding is only applied if the following condition is true:

(last_non_zero_position_in_subset−first_non_zero_position_in_subset)>=threshold

If sign hiding is applied to a coefficient subset, the encoder of the bitstream ensures that the parity of the sum of all nonzero coefficients in that coefficient subset matches the sign bit of the first nonzero coefficient.

II. Trellis Coded Quantization

Trellis coded quantization (TCQ) is a combination of trellis structure and set partitioning. By finding a path with the smallest distortion along the trellis structure, the coded output for a couple of samples with the smallest distortion (measured by e.g., mean square error or MSE) can be found.

Figure 1:
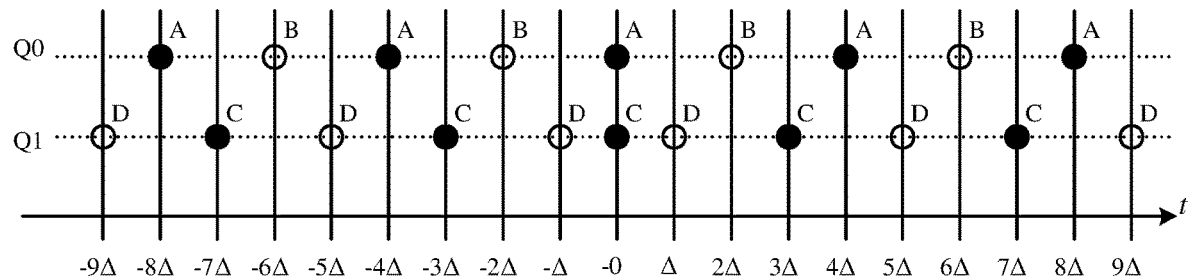
FIG. 1 shows two scalar quantizers used for dependent quantization.

In some embodiments, TCQ is applied to achieve dependent scalar quantization. Specifically, the set of admissible reconstruction values for a transform coefficient depends on the values of the transform coefficient levels that precede the current transform coefficient level in reconstruction order. FIG. 1 shows two scalar quantizers, denoted by Q0 and Q1 used for TCQ dependent quantization. The location of the available reconstruction levels is uniquely specified by a quantization step size $\Delta$. The two scaler quantizers Q0 and Q1 are characterized as follows:

Q0: The reconstruction levels of the first quantizer Q0 are given by the even integer multiples of the quantization step size Δ. When this quantizer is used, a reconstructed transform coefficient t' is calculated according to t'=2·k·Δ, where k denotes the associated transform coefficient level (transmitted quantization index).

Q1: The reconstruction levels of the second quantizer Q1 are given by the odd integer multiples of the quantization step size Δ and, in addition, the reconstruction level equal to zero. The mapping of transform coefficient levels k to reconstructed transform coefficients t' is specified according to t'=(2·k−sgn(k))·Δ, wherein sgn(•) denotes the signum function sgn(x)=(k==0? 0: (k<0?−1:1)).

Figure 2:
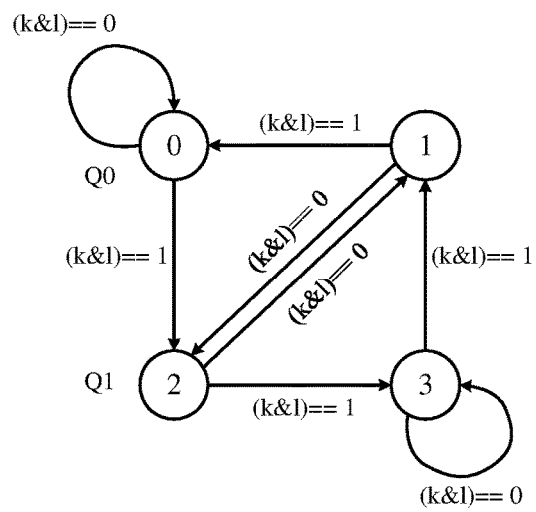
FIG. 2 shows the finite state machine corresponds to the trellis structure used in dependent scalar quantization.

The scalar quantizer used (Q0 or Q1) is not explicitly signaled in the bitstream. It is determined by the parities of the transform coefficient levels that precede the current transform coefficient in coding/reconstruction order. The switching is done by the finite state machine with four state. FIG. 2 shows the finite state machine corresponds to the trellis structure used in dependent scalar quantization.

Figure 3:
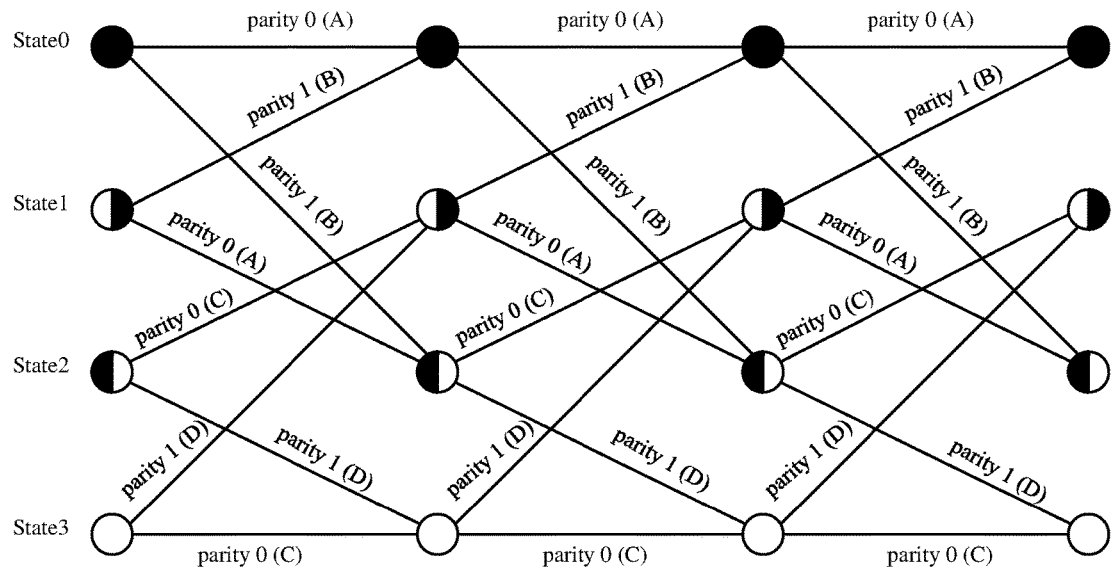
FIG. 3 shows a trellis structure used by the quantization process.

During the quantization process, the video encoder/decoder traverses through the trellis structure using Viterbi algorithm. FIG. 3 shows a trellis structure used by the quantization process. In each stage, the path with the smaller distortion for each state remains. Therefore, the path can be uniquely determined during backward traversal. Finding the levels for a couple of samples with the smallest distortion is equivalent to finding the path that ends with the smallest distortion.

Figure 4:
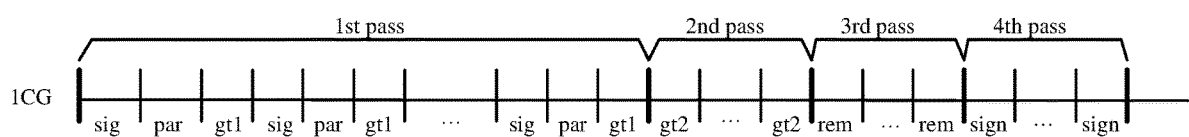
FIG. 4 illustrates a four-pass syntax signaling method for coefficient in each coding group.

For some embodiments, FIG. 4 illustrates a four-pass syntax signaling method for coefficient in each coding group (CG). As illustrated:

pass 1: the following flags are transmitted for each scan position (using the regular mode in entropy coding): sig_coeff_flag and, when sig_coeff_flag is equal to 1, par_level_flag and rem_abs_gt1_flag;

pass 2: for all scan positions with rem_abs_gt1_flag equal to 1, rem_abs_gt2_flag is coded using the regular mode of the arithmetic coding engine;

pass 3: for all scan positions with rem_abs_gt2_flag equal to 1, the non-binary syntax element abs_remainder is coded in the bypass mode of the arithmetic coding engine; and pass 4: for all scan positions with sig_coeff_flag equal to 1, a syntax element sign_flag is coded in the bypass mode of the arithmetic coding engine.

Figure 5:
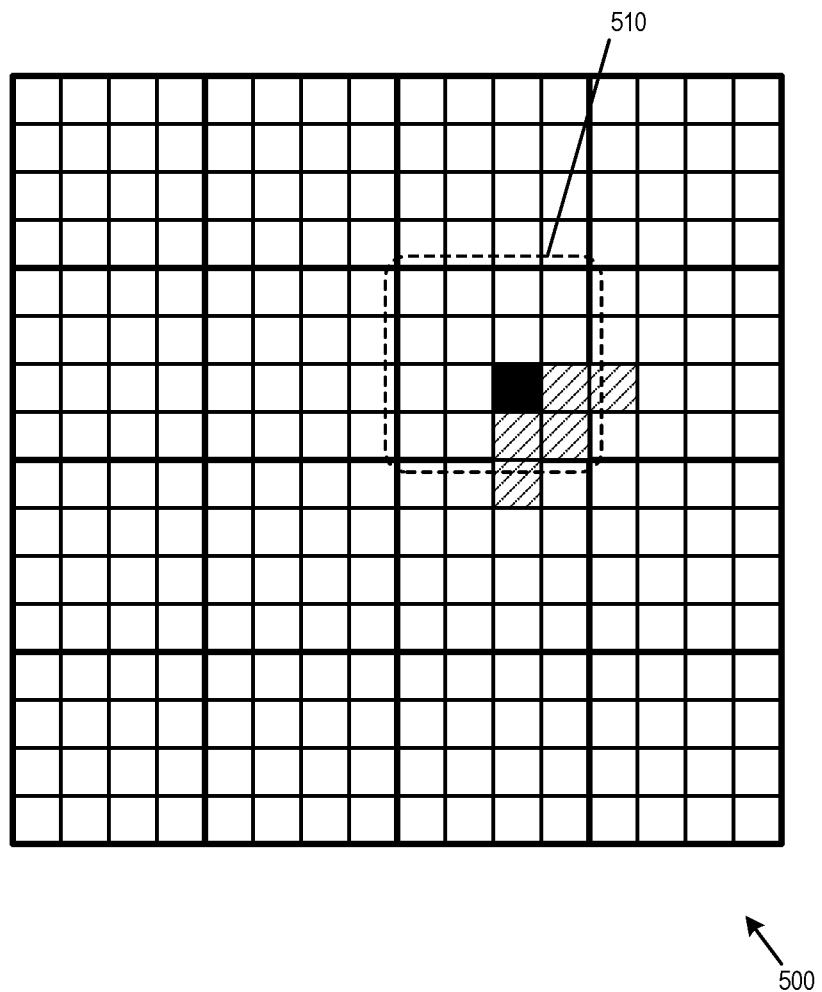
FIG. 5 shows the selection of probability models for scan positions in a coding group.

FIG. 5 shows the selection of probability models for scan positions in a coding group. The figure shows a transform block 500 that is divided into several coding groups (CGs). Each CG includes transform coefficients in 4×4 scan positions. For example, for a CG 510, the black square represents a current scan position, and the hashed squares represent its local neighborhood. The local neighborhood is used for selecting the probability model of the current scan position. The context modelling and binarization depends on the following measures for the local neighborhood:

numSig: the number of non-zero levels in the local neighbourhood;

sumAbs1: the sum of partially reconstructed absolute levels (absLevel1) after the first pass in the local neighbourhood;

sumAbs: the sum of reconstructed absolute levels in the local neighbourhood d=x+y, where x and y are the position in x-axis and y-axis in current TU respectively.

The context model of sig_flag depends on current state, which can be derived as follows:

for luma component:
ctxIdSig=18*max(0, state−1)+min(sumAbs1, 5)+(d<2? 12: (d<5? 6:0));

for chroma component:
ctxIdSig=12*max(0, state−1)+min(sumAbs1, 5)+(d<2? 6:0));

The context model of par_level_flag is described as follows:

If the current scan position is equal to the position of the last non-zero level (as indicted by the transmitted x and y coordinates), ctxIdPar is set equal to 0.

Otherwise, if the current colour component is the luma component, the context index is set to
ctxIdPar=1+min(sumAbs1−numSig, 4)+(d==0? 15: (d<3? 10: (d<10? 5:0)))

Otherwise (the current colour component is the chroma component), the context index is set to
ctxIdPar=1+min(sumAbs1−numSig, 4)+(d==0? 5:0)

The context of rem_abs_gtx_flag is described as follows:

ctxIdGt1=ctxIdPar ctxIdGt2=ctxIdPar

The non-binary syntax element abs_remainder is binarized using the same class of Rice codes as in HEVC. The Rice parameter ricePar is determined as follows:

If sumAbs—numSig is less than 12, ricePar is set equal to 0.

Otherwise, if sumAbs—numSig is less than 25, ricePar is set equal to 1.

Otherwise, ricePar is set equal to 2.

III. Signalling of Dependent Quantization and Sign Hiding

For some embodiments, a sequence parameter set (SPS) that is applicable to a coded layer video sequence (CLVS) that includes a sequence of video pictures is specified according to Table 1:

TABLE 1

Example Sequence Parameter Set (SPS)

| | Descriptor |
|---|---|
| seq_parameter_set_rbsp( ) { | |
|     sps_decoding_parameter_set_id | u(4) |
|     sps_video_parameter_set_id | u(4) |
|     sps_max_sublayers_minus1 | u(3) |
|     sps_reserved_zero_4bits | u(4) |
|     sps_ptl_dpb_hrd_params_present_flag | u(1) |
|     if( sps_ptl_dpb_hrd_params_present_flag ) | |
|         profile_tier_level( 1, sps_max_sublayers_minus1 ) | |
|     gdr_enabled_flag | u(1) |
|     sps_seq_parameter_set_id | u(4) |

TABLE 1-continued

Example Sequence Parameter Set (SPS)

| | Descriptor |
|---|---|
| chroma_format_idc | u(2) |
| if( chroma_format_idc = = 3 ) | |
|     separate_colour_plane_flag | u(1) |
| ref_pic_resampling_enabled_flag | u(1) |
| pic_width_max_in_luma_samples | ue(v) |
| pic_height_max_in_luma_samples | ue(v) |
| sps_log2_ctu_size_minus5 | u(2) |
| subpics_present_flag | u(1) |
| if( subpics_present_flag ) { | |
|     sps_num_subpics_minus1 | u(8) |
|     for( i = 0; i <= sps_num_subpics_minus1; i++ ) { | |
|         subpic_ctu_top_left_x[ i ] | u(v) |
|         subpic_ctu_top_left_y[ i ] | u(v) |
|         subpic_width_minus1[ i ] | u(v) |
|         subpic_height_minus1[ i ] | u(v) |
|         subpic_treated_as_pic_flag[ i ] | u(1) |
|         loop_filter_across_subpic_enabled_flag[ i ] | u(1) |
|     } | |
| } | |
| sps_subpic_id_present_flag | u(1) |
| if( sps_subpics_id_present_flag ) { | |
|     sps_subpic_id_signalling_present_flag | u(1) |
|     if( sps_subpics_id_signalling_present_flag ) { | |
|         sps_subpic_id_len_minus1 | ue(v) |
|         for( i = 0; i <= sps_num_subpics_minus1; i++ ) | |
|             sps_subpic_id[ i ] | u(v) |
|     } | |
| } | |
| bit_depth_minus8 | ue(v) |
| min_qp_prime_ts_minus4 | ue(v) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|     poc_msb_len_minus1 | ue(v) |
| if( sps_max_sublayers_minus1 > 0 ) | |
|     sps_sublayer_dpb_params_flag | u(1) |
| if( sps_ptl_dpb_hrd_params_present_flag ) | |
|     dpb_parameters( 0, sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|         ref_pic_list_struct( i, j ) | |
| } | |
| if( ChromaArrayType != 0 ) | |
|     qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
| } | |
| if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
| } | |
| if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|         sps_log2_diff_max_bt_min_qt_intra_slice_chroma | ue(v) |
|         sps_log2_diff_max_tt_min_qt_intra_slice_chroma | ue(v) |
|     } | |
| } | |

TABLE 1-continued

Example Sequence Parameter Set (SPS)

|  | Descriptor |
|---|---|
| sps_max_luma_transform_size_64_flag | u(1) |
| sps_joint_cbcr_enabled_flag | u(1) |
| if( ChromaArrayType != 0 ) { |  |
|     same_qp_table_for_chroma | u(1) |
|     numQpTables = same_qp_table_for_chroma ? 1 : ( sps_joint_cbcr_enabled_flag ? 3 : 2 ) |  |
|     for( i = 0; i < numQpTables; i++ ) { |  |
|         qp_table_start_minus26[ i ] | se(v) |
|         num_points_in_qp_table_minus1[ i ] | ue(v) |
|         for( j = 0; j <= num_pomts_m_qp_table_minus1[ i ]; j++ ) { |  |
|             delta_qp_in_val_minus1[ i ][ j ] | ue(v) |
|             delta_qp_diff_val[ i ][ j ] | ue(v) |
|         } |  |
|     } |  |
| } |  |
| sps_sao_enabled_flag | u(1) |
| sps_alf_enabled_flag | u(1) |
| sps_transform_skip_enabled_flag | u(1) |
| if( sps_transform_skip_enabled_flag ) |  |
|     sps_bdpcm_enabled_flag | u(1) |
| if( sps_bdpcm_enabled_flag && chroma_format_idc == 3 ) |  |
|     sps_bdpcm_chroma_enabled_flag | u(1) |
| sps_ref_wraparound_enabled_flag | u(1) |
| if( sps_ref_wraparound_enabled_flag ) |  |
|     sps_ref_wraparound_offset_minus1 | ue(v) |
| sps_temporal_mvp_enabled_flag | u(1) |
| if( sps_temporal_mvp_enabled_flag ) |  |
|     sps_sbtmvp_enabled_flag | u(1) |
| sps_amvr_enabled_flag | u(1) |
| sps_bdof_enabled_flag | u(1) |
| if( sps_bdof_enabled_flag ) |  |
|     sps_bdof_pic_present_flag | u(1) |
| sps_smvd_enabled_flag | u(1) |
| sps_dmvr_enabled_flag | u(1) |
| if( sps_dmvr_enabled_flag) |  |
|     sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) |  |
|     sps_cclm_enabled_flag | u(1) |
| if( chroma_format_idc == 1 ) { |  |
|     sps_chroma_horizontal_collocated_flag | u(1) |
|     sps_chroma_vertical_collocated_flag | u(1) |
| } |  |
| sps_mts_enabled_flag | u(1) |
| if( sps_mts_enabled_flag ) { |  |
|     sps_explicit_mts_intra_enabled_flag | u(1) |
|     sps_explicit_mts_inter_enabled_flag | u(1) |
| } |  |
| sps_sbt_enabled_flag | u(1) |
| sps_affine_enabled_flag | u(1) |
| if( sps_affine_enabled_flag ) { |  |
|     sps_affine_type_flag | u(1) |
|     sps_affine_amvr_enabled_flag | u(1) |
|     sps_affine_prof_enabled_flag | u(1) |
|     if( sps_affine_prof_enabled_flag ) |  |
|         sps_prof_pic_present_flag | u(1) |
| } |  |
| if( chroma_format_idc == 3 ) { |  |
|     sps_palette_enabled_flag | u(1) |
|     sps_act_enabled_flag | u(1) |
| } |  |
| sps_bcw_enabled_flag | u(1) |
| sps_ibc_enabled_flag | u(1) |
| sps_ciip_enabled_flag | u(1) |
| if( sps_mmvd_enabled_flag ) |  |
|     sps_fpel_mmvd_enabled_flag | u(1) |
| sps_triangle_enabled_flag | u(1) |
| sps_lmcs_enabled_flag | u(1) |
| sps_lfnst_enabled_flag | u(1) |

TABLE 1-continued

Example Sequence Parameter Set (SPS)

| | Descriptor |
|---|---|
| sps_ladf_enabled_flag | u(1) |
| if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|         sps_ladf_qp_offset[ i ] | se(v) |
|         sps_ladf_delta_threshold_minus1[ i ] | ue(v) |
|     } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
|     sps_num_ver_virtual_boundaries | u(2) |
|     for( i = 0; i < sps_num_ver_virtual_boundaries; i++ ) | |
|         sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|         sps_virtual_boundaries_pos_y[ i ] | u(13) |
| } | |
| if( sps_ptl_dpb_hrd_params_present_flag ) { | |
|     sps_general_hrd_params_present_flag | u(1) |
|     if( sps_general_hrd_params_present_flag ) { | |
|         general_hrd_parameters( ) | |
|         if( sps_max_sublayers_minus1 > 0 ) | |
|             sps_sublayer_cpb_params_present_flag | u(1) |
|         firstSubLayer = sps_sublayer_cpb_params_present_flag ? 0 : | |
|             sps_max_sublayers_minus1 | |
|         ols_hrd_parameters( firstSubLayer, sps_max_sublayers_minus1 ) | |
|     } | |
| } | |
| field_seq_flag | u(1) |
| vui_parameters_present_flag | u(1) |
| if( vui_parameters_present_flag ) | |
|     vui_parameters( ) /* Specified in ITU-T H.SEI | ISO/IEC 23002-7 */ | |
| sps_extension_flag | u(1) |
| if( sps_extension_flag ) | |
|     while( more_rbsp_data( )) | |
|         sps_extension_data_flag | u(1) |
| rbsp_trailing_bits( ) | |
| } | |

In some embodiments, a SPS flag is added for dependent quantization. The related syntax and semantics is shown in Table 2:

TABLE 2

SPS with added flag for dependent quantization:

| | Descriptor |
|---|---|
| seq_parameter_set_rbsp ( ) { | |
| ... | |
|     sps_sao_enabled_flag | u(1) |
|     sps_alf_enabled_flag | u(1) |
|     sps_transform_skip_enabled_flag | u(1) |
|     if( sps_transform_skip_enabled_flag ) | |
|         sps_bdpcm_enabled_flag | u(1) |
|     if( sps_bdpcm_enabled_flag && chroma_format_idc = = 3 ) | |
|         sps_bdpcm_chroma_enabled_flag | u(1) |
|     sps_ref_wraparound_enabled_flag | u(1) |
|     if( sps_ref_wraparound_enabled_flag ) | |
|         sps_ref_wraparound_offset_minus1 | ue(v) |
| ... | |
| sps_dep_quant_enabled_flag | u(1) |
|     if( picture_header_extension_present_flag ) { | |
|         ph_extension_length | ue(v) |
|         for( i = 0; i < ph_extension_length; i++) | |
|             ph_extension_data_byte[ i ] | u(8) |
|     } | |
|     rbsp_trailing_bits( ) | |
| } | |

The value of sps_dep_quant_enabled_flag being 1 specifies that the dependent quantization may be used in decoding of pictures in the CLVS. The the value of sps_dep_quant_enabled_flag being 0 specifies that the dependent quantization is not used in the CLVS. When sps_dep_quant_enabled_flag is not present, it is inferred to be equal to 0.

In some embodiments, the picture paramerter set (PPS) that the current picture is referring to includes syntax elements for enabling dependenat quantization. Table 3 shows an example picture header in which the SPS flag for dependent quantization is used to determine whether to signal enabling dependent quantization at picture level.

TABLE 3

Picture Header using SPS flag for dependent quantization

| picture_header_rbsp( ) { | |
|---|---|
| ... | |
| if ( !pps_dep_quant_enabled_flag && sps_dep_quant_enabled_flag) | |
|     pic_dep_quant_enabled_flag | u(1) |
| if( !pic_dep_quant_enabled_flag ) | |
|     sign_data_hiding_enabled_flag | u(1) |
| if( deblocking_filter_override_enabled_flag ) { | |
|     pic_deblocking_filter_override_present_flag | u(1) |
|     if( pic_deblocking_filter_override_present_flag ) { | |
|         pic_deblocking_filter_override_flag | u(1) |
| ... | |

The value of pic_dep_quant_enabled_flag being 0 specifies that dependent quantization is disabled for slices associated with the picture header. The value of pic_dep_quant_enabled_flag being 1 specifies that dependent quantization is enabled for slices associated with the PH. When pic_dep_quant_enabled_flag is not present and sps_dep_quant_enabled_flag is 0, pic_dep_quant_enabled_flag is inferred to be 0. Otherwise, when pic_dep_quant_enabled_flag is not present and sps_dep_quant_enabled_flag is 1, the value of pic_dep_quant_enabled_flag is infered to be pps_dep_quant_enable_idc−1.

The value of pps_dep_quant_enabled_idc being 0 specifies that the syntax element pic_dep_quant_enabled_flag may be present in picture headers referring to the PPS. The value of pps_dep_quant_enabled_idc being 1 or 2 specifies that the syntax element pic_dep_quant_enabled_flag is not present in PHs referring to the PPS. (The value of pps_dep_quant_enabled_idc being 3 is reserved for future use.)

In some embodiments, SPS flags are added for dependent quantization and for sign hiding, and the flag for dependent quantization and the flag for sign hiding are exclusively signaled. Specifically, sps_sign_data_hiding_enabled_flag is signaled only when dependent quantization is disabled (sps_dep_quant_enabled_flag is 0). The related syntax and semantics are shown according to Table 4.

TABLE 4

SPS with flags for dependent quantization and for sign hiding

| | Descriptor |
|---|---|
| seq_parameter_set_rbsp ( ) { | |
| ... | |
|     sps_sao_enabled_flag | u(1) |
|     sps_alf_enabled_flag | u(1) |
|     sps_transform_skip_enabled_flag | u(1) |
|     if( sps_transform_skip_enabled_flag ) | |
|         sps_bdpcm_enabled_flag | u(1) |
|     if( sps_bdpcm_enabled_flag && chroma_format_idc = = 3 ) | |
|         sps_bdpcm_chroma_enabled_flag | u(1) |
|     sps_ref_wraparound_enabled_flag | u(1) |
|     if( sps_ref_wraparound_enabled_flag ) | |
|         sps_ref_wraparound_offset_minus1 | ue(v) |
| ... | |
|     sps_dep_quant_enabled_flag | u(1) |
|     if (!sps_dep_quant_enabled_flag) | |
|         sps_sign_data_hiding_enabled_flag | u(1) |
|         if( picture_header_extension_present_flag ) { | |
|             ph_extension_length | ue(v) |
|             for( i = 0; i < ph_extension_length; i++) | |
|                 ph_extension_data_byte[ i ] | u(8) |
|     } | |
|     rbsp_trailing_bits( ) | |
| } | |

The value of the syntax element sps_sign_data_hiding_enabled_flag being 0 specifies that sign hiding is disabled in the CLVS. The value of sign_data_hiding_enabled_flag being 1 specifies that sign hiding is enabled in the CLVS. When sps_sign_data_hiding_enabled_flag is not present, it is inferred to be equal to 0. Table 5 shows an example picture header in which the SPS flags for dependent quantization and sign hiding are used to determine whether to signal dependent quantization enable and sign hiding enable at picture level (applicable to slices of the picture.)

TABLE 5

| Picture Header using SPS flags for dependent quantization and sign hiding | |
|---|---|
| picture_header_rbsp( ) { | |
| ... | |
|   if ( !pps_dep_quant_enabled_flag && sps_dep_quant_enabled_flag) | |
|     pic_dep_quant_enabled_flag | u(1) |
|   if( !pic_dep_quant_enabled_flag && sps_sign_data_hiding_enabled_flag) | |
|     sign_data_hiding_enabled_flag | u(1) |
|   if( deblocking_filter_override_enabled_flag ) { | |
|     pic_deblocking_filter_override_present_flag | u(1) |
|     if( pic_deblocking_filter_override_present_flag ) { | |
|       pic_deblocking_filter_override_flag | u(1) |
| ... | |

In some embodiments, the flag for sign hiding is signaled before the flag for dependent quantization in SPS, and the flag for dependent quantization and the flag for sign hiding are exclusively signaled. Specifically, sps_dep_quant_enabled_flag is signaled only when sign hiding is disabled (sps_sign_data_hiding_enabled_flag is 0). Table 6 shows a corresponding example SPS.

TABLE 6

| SPS with sign hiding signaled before dependent quantization | |
|---|---|
| | Descriptor |
| seq_parameter_set_rbsp ( ) { | |
| ... | |
|   sps_sao_enabled_flag | u(1) |
|   sps_alf_enabled_flag | u(1) |
|   sps_transform_skip_enabled_flag | u(1) |
|   if( sps_transform_skip_enabled_flag ) | |
|     sps_bdpcm_enabled_flag | u(1) |
|   if( sps_bdpcm_enabled_flag && chroma_format_idc = = 3 ) | |
|     sps_bdpcm_chroma_enabled_flag | u(1) |
|   sps_ref_wraparound_enabled_flag | u(1) |
|   if( sps_ref_wraparound_enabled_flag ) | |
|     sps_ref_wraparound_offset_minus1 | ue(v) |
| ... | |
|   sps_sign_data_hiding_enabled_flag | |
|   if (!sps_sign_data_hiding_enabled_flag) | |
|     sps_dep_quant_enabled_flag | u(1) |
|   if( picture_header_extension_present_flag ) { | |
|     ph_extension_length | ue(v) |
|     for( i = 0; i < ph_extension_length; i++) | |
|       ph_extension_data_byte[ i ] | u(8) |
|   } | |
|   rbsp_trailing_bits( ) | |
| } | |

In some embodiments, SPS flags for dependent quantization and sign hiding are both signaled in SPS, but they are constrained to be enabled exclusively. The related syntax and semantics are shown in Table 7.

TABLE 7

| SPS signaling both sign hiding and dependent quantization | |
|---|---|
| | Descriptor |
| seq_parameter_set_rbsp ( ) { | |
| ... | |
|   sps_sao_enabled_flag | u(1) |
|   sps_alf_enabled_flag | u(1) |

TABLE 7-continued

SPS signaling both sign hiding and dependent quantization

| | Descriptor |
|---|---|
| sps_transform_skip_enabled_flag | u(1) |
| if( sps_transform_skip_enabled_flag ) | |
|     sps_bdpcm_enabled_flag | u(1) |
| if( sps_bdpcm_enabled_flag && chroma_format_idc = = 3 ) | |
|     sps_bdpcm_chroma_enabled_flag | u(1) |
| sps_ref_wraparound_enabled_flag | u(1) |
| if( sps_ref_wraparound_enabled_flag ) | |
|     sps_ref_wraparound_offset_minus1 | ue(v) |
| ... | |
| sps_sign_data_hiding_enabled_flag | u(1) |
| sps_dep_quant_enabled_flag | u(1) |
|     if( picture_header_extension_present_flag ) { | |
|         ph_extension_length | ue(v) |
|         for( i = 0; i < ph_extension_length; i++) | |
|             ph_extension_data_byte[ i ] | u(8) |
|     } | |
|     rbsp_trailing_bits( ) | |
| } | |

The value of sps_dep_quant_enabled_flag is constrained to be equal to 0 if sps_sign_data_hidigin_enabled_flag is equal to 1, and the value of sps_sign_data_hidigin_enabled_flag is constrained to be equal to 0 if sps_dep_quant_enabled_flag is equal to 1.

In some embodiments, a joint dependent quantization/sign hiding indicator is present in SPS to indicate the on-off of dependent quantization and sign hiding. The related syntax and semantics are shown in Table 8.

TABLE 8

SPS with joint dependent quantization/sign hiding indicator

| | Descriptor |
|---|---|
| seq_parameter_set_rbsp ( ) { | |
| ... | |
|     sps_sao_enabled_flag | u(1) |
|     sps_alf_enabled_flag | u(1) |
|     sps_transform_skip_enabled_flag | u(1) |
|     if( sps_transform_skip_enabled_flag ) | |
|         sps_bdpcm_enabled_flag | u(1) |
|     if( sps_bdpcm_enabled_flag && chroma_format_idc = = 3 ) | |
|         sps_bdpcm_chroma_enabled_flag | u(1) |
|     sps_ref_wraparound_enabled_flag | u(1) |
|     if( sps_ref_wraparound_enabled_flag ) | |
|         sps_ref_wraparound_offset_minus1 | ue(v) |
| ... | |
| sps_dq_sh_enabled_idc | u(2) |
|     if( picture_header_extension_present_flag ) { | |
|         ph_extension_length | ue(v) |
|         for( i = 0; i < ph_extension_length; i++) | |
|             ph_extension_data_byte[ i ] | u(8) |
|     } | |
|     rbsp_trailing_bits( ) | |
| } | |

The syntax element sps_dp_sh_enabled_idc is the joint dependent quantization/sign hiding indicator. The value of sps_dp_sh_enabled_idc being 0 specifies that pps_dep_quant_enabled_idc is 0 and that pic_dep_quant_enabled_flag and sign_data_hiding_enabled_flag are not present in picture header. The value of sps_dp_sh_enabled_idc being 1 specifies that sign_data_hiding_enabled_flag is not present in picture header. The value of sps_dp_sh_enabled_idc being 2 specifies that pps_dep_quant_enabled_idc is equal to 0 and pic_dep_quant_enabled_flag is not present in picture header. The value of sps_dp_sh_enabled_idc being 3 is reserved for future use. When sps_dp_sh_enabled_idc is not present, it is inferred to be 0. Table 9 shows a picture header that uses the sps_dp_sh_enabled_idc indicator.

TABLE 9 picture header using SPS dependent quantization/sign hiding indicator picture_header_rbsp( ) {
...
    if ( !pps_dep_quant_enabled_flag && sps_dp_sh_enabled_idc==1)
        pic_dep_quant_enabled_flag                                       u(1)
    if( !pic_dep_quant_enabled_flag && sps_dp_sh_enabled_idc==2)
        sign_data_hiding_enabled_flag                              u(1)
    if( deblocking_filter_override_enabled_flag ) {
        pic_deblocking_filter_override_present_flag             u(1)
        if( pic_deblocking_filter_override_present_flag ) {
            pic_deblocking_filter_override_flag                  u(1)
...

In some embodiments, SPS flags for dependent quantization and sign hiding are present, but there is no conditional signalling between these two flags. In some embodiments, the two SPS flags for dependent quantization and sign hiding are constrained to not both be 1, i.e., they are enabled exclusively. The related syntax and semantics in SPS are shown in Table 10.

TABLE 10

SPS with flags for both dependent quantization and sign hiding

|  | Descriptor |
|---|---|
| seq_parameter_set_rbsp ( ) { |  |
| ... |  |
|   sps_sao_enabled_flag | u(1) |
|   sps_alf_enabled_flag | u(1) |
|   sps_transform_skip_enabled_flag | u(1) |
|   if( sps_transform_skip_enabled_flag ) |  |
|     sps_bdpcm_enabled_flag | u(1) |
|   if( sps_bdpcm_enabled_flag && chroma_format_idc = = 3 ) |  |
|     sps_bdpcm_chroma_enabled_flag | u(1) |
|   sps_ref_wraparound_enabled_flag | u(1) |
|   if( sps_ref_wraparound_enabled_flag ) |  |
|     sps_ref_wraparound_offset_minus1 | ue(v) |
| ... |  |
| sps_sign_data_hiding_enabled_flag | u(1) |
| sps_dep_quant_enabled_flag | u(1) |
|   if( picture_header_extension_present_flag ) { |  |
|     ph_extension_length | ue(v) |
|     for( i = 0; i < ph_extension_length; i++) |  |
|       ph_extension_data_byte[ i ] | u(8) |
|   } |  |
|   rbsp_trailing_bits( ) |  |
| } |  |

In a picture header such as the one shown in Table 5 above, the related syntax for dependent quantization and sign hiding cannot be present at the same time and they shall not be present in picture header if the corresponding SPS enabled flags are not enabled. In some embodiments, if dependent quantization enabled flag in SPS is equal to 0, none of dependent quantization related syntax shall be present in picture header, regardless of whether the sign hiding flag indicates on or off.

In some embodiments, pic_dep_quant_enabled_flag is signalled in a picture header if sps_dep_quant_enabled_flag is equal to 1. The signalling condition does not include PPS flag (e.g. pps_dep_quant_enabled_flag). For example, if sps_dep_quant_enabled_flag is equal to 0, pic_dep_quant_enabled_flag shall not be present.

In some embodiments, sign_data_hiding_enabled_flag is signalled before pic_dep_quant_enabled_flag. There is no conditional signalling between these two flags. In some embodiments, these two flags cannot both be 1, i.e., they shall be enabled exclusively. If sign_data_hiding_enabled_flag is equal to 1, pic_dep_quant_enabled_flag shall not present in picture header.

IV. Example Video Encoder

Figure 6:
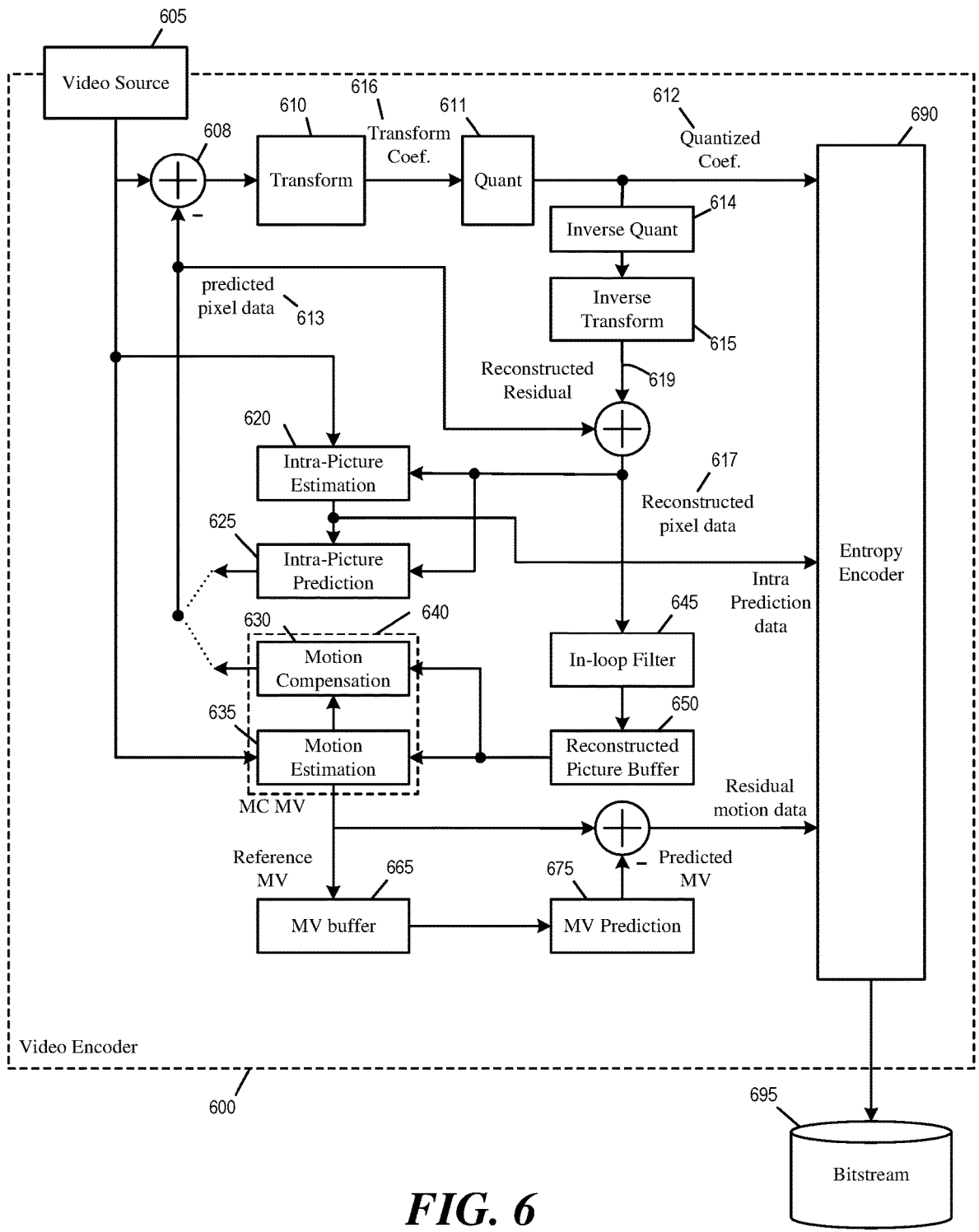
FIG. 6 illustrates an example video encoder that may implement sign hiding and dependent quantization.

FIG. 6 illustrates an example video encoder 600 that may implement sign hiding and dependent quantization. As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625. The transform module 610 converts the difference (or the residual pixel data or residual signal 609) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
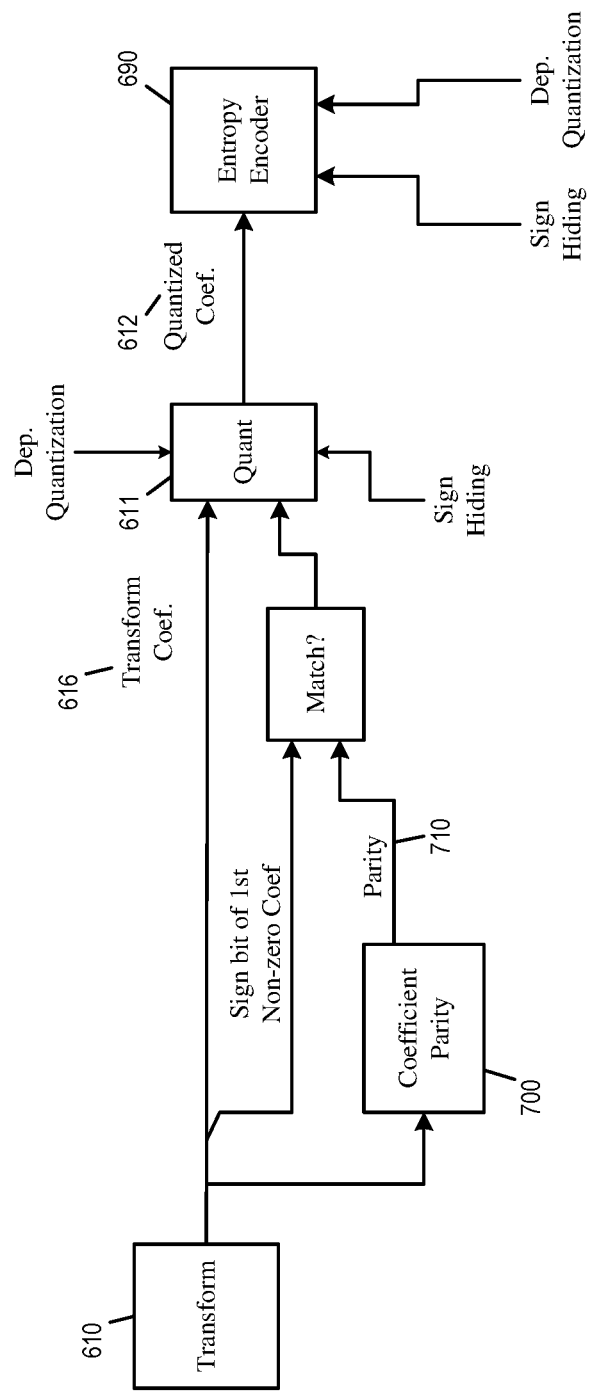
FIG. 7 illustrates portions of the video encoder that implement sign hiding and dependent quantization.

FIG. 7 illustrates portions of the video encoder 600 that implement sign hiding and dependent quantization. Specifically, the figure illustrates the components of the encoder 600 that generates, quantizes, and entropy encodes transform coefficients into the bitstream 695. As illustrated, the transform module 610 transforms raw pixel data into transform coefficients to be quantized by the quantizer 611. A coefficient parity module 700 computes a parity 710 of a sum of all nonzero coefficients in a coefficient subset (e.g., a 4×4 coding group). When sign hiding is enabled for the subset, the encoder 600 ensures that the parity of the sum of all nonzero coefficients in that coefficient subset matches the sign bit of the first nonzero coefficient, by e.g., altering a least significant bit of a coefficient in the subset, or by forcibly disabling sign hiding.

The quantizer 611 quantizes the received coefficients based on whether dependent quantization is enabled and whether sign hiding is enabled. When sign hiding is enabled, the sign bit of the first nonzero coefficient is not part of the quantized coefficients 612 provided to the entropy encoder 690. When dependent quantization is enabled, the quantization of a current transform coefficient is limited to a set of admissible values that are determined based on transform coefficients that precede the current transform coefficient in reconstruction order according to a trellis structure.

The entropy encoder 690 entropy encodes the quantized coefficients 612 into the bitstream 695, along with flags that indicate whether dependent quantization and/or sign hiding are enabled. In some embodiments, the dependent quantization and/or sign hiding flags are exclusively signaled, e.g., the flag for sign hiding is explicitly signaled only if the flag for dependent quantization indicates that dependent quantization is disabled, else sign hiding is inferred to be disabled. In some embodiments, the flags for dependent quantization and/or sign hiding are signaled at a sequence level (e.g., at a SPS) that are applicable to pictures in the sequence, and at a picture level (e.g., at a PH) that are applicable to slices of the picture.

Figure 8:
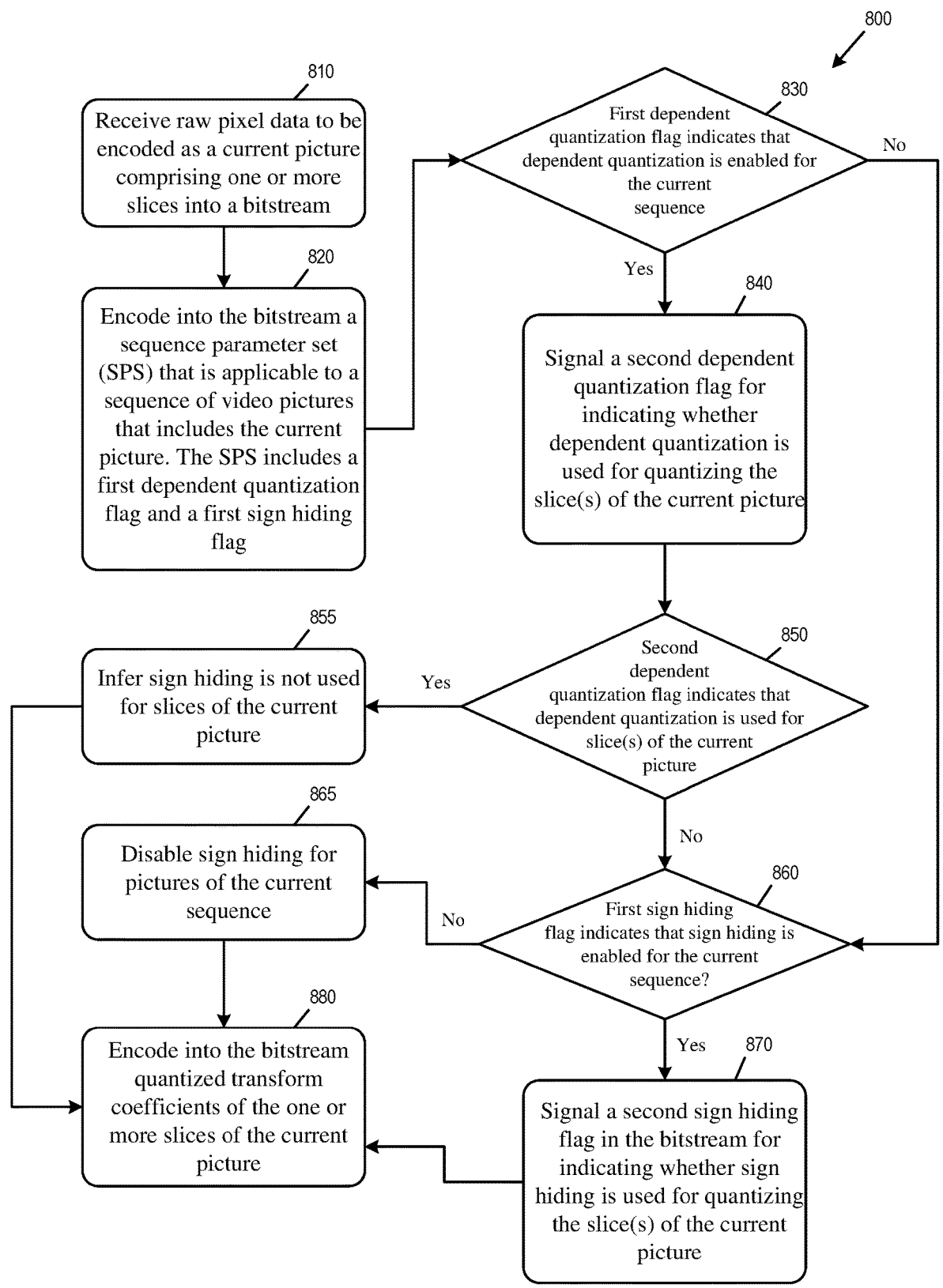
FIG. 8 conceptually illustrates a process that the video encoder uses for dependent quantization and sign hiding.

FIG. 8 conceptually illustrates a process 800 that the video encoder 600 uses for dependent quantization and sign hiding. In some embodiments, one or more processing units (e.g., a processor) of a computing device implements the encoder 600 performs the process 800 by executing instructions stored in a computer readable medium. In some embodiments, an electronic apparatus implementing the encoder 600 performs the process 800.

The encoder receives (at block 810) data to be encoded as a current picture having one or more slices into a bitstream.

The encoder (at block 820) encodes into the bitstream a sequence parameter set (SPS) that is applicable to a sequence of video pictures that includes the current picture. The SPS includes a first dependent quantization flag (e.g., sps_dep_quant_enabled_flag as shown in Table 4) and a first sign hiding flag (e.g., sps_sign_data_hiding_enabled_flag as shown in Table 4). In some embodiments, only one of dependent quantization and sign hiding is enabled for the one or more slices of the current picture. In other words, dependent quantization and sign hiding are exclusively signaled in the bitstream. In some embodiments, the first dependent quantization flag and the first sign hiding flag are exclusively signaled in the SPS, and the first sign hiding flag is not signaled in the SPS and inferred to disable sign hiding when the first dependent quantization flag is explicitly signaled in the SPS to enable dependent quantization.

The encoder determines (at block 830) whether the first dependent quantization flag indicates that dependent quantization is enabled for the current sequence. If dependent quantization is enabled, the process proceeds to 840. Otherwise, the process proceeds to 860.

The encoder signals (at block 840) a second dependent quantization flag (e.g., pic_dep_quant_enabled_flag shown in Table 5) into the bitstream for indicating whether dependent quantization is used for quantizing the one or more slices of the current picture. In some embodiments, the second dependent quantization flag is signaled in a picture header that is applicable to the one or more slices of the current picture.

The encoder determines (at block 850) whether the second dependent quantization flag indicates that dependent quantization is used for one or more slices of the current picture. If dependent quantization is used, the process proceeds to block 855. If dependent quantization is not used, the process proceeds to block 860. When dependent quantization is used for the one or more slices of the current picture, a current transform coefficient in the one or more slices of the current picture is limited to a set of admissible (reconstruction) values that are determined based on transform coefficients that precede the current transform coefficient in reconstruction order according to a trellis structure. The transform coefficients of the one or more slices are quantized by a scaler quantizer that is determined by parities of the transform coefficients that precede the current transform coefficient in reconstruction order.

The encoder infers (at block 855) sign hiding is to be disabled for the one or more slices of the current picture and the second sign hiding flag is not parsed. The process then proceeds to 880.

The encoder determines (at block 860) whether the first sign hiding flag indicates that sign hiding is enabled for the current sequence. If sign hiding is enabled for the current sequence, the process proceeds to block 870. If sign hiding is not enabled for the current sequence, the process proceeds to 865.

The encoder infers (at block 865) sign hiding to be disabled for the one or more slices of the current picture and the second sign hiding flag is not parsed. The process then proceeds to 880.

The encoder signals (at block 870) a second sign hiding flag (e.g., sign_data_hiding_enable_flag shown in Table 5) into the bitstream for indicating whether sign hiding is used for quantizing the one or more slices of the current picture. In some embodiments, the second sign hiding flag is signaled in a picture header that is applicable to the one or more slices of the current picture. When sign hiding is used for quantizing the one or more slices of the current picture, a sign bit of a first non-zero transform coefficient of a coefficient subset in the one or more slices is determined based on a parity of a sum of all nonzero coefficients in the coefficient subset. The process then proceeds to 880.

The encoder encodes (at block 880) into the bitstream the quantized transform coefficients of the one or more slices of the current picture. The quantization of the transform coefficients is performed based on whether dependent quantization is used and whether sign hiding is used.

V. Example Video Decoder

Figure 9:
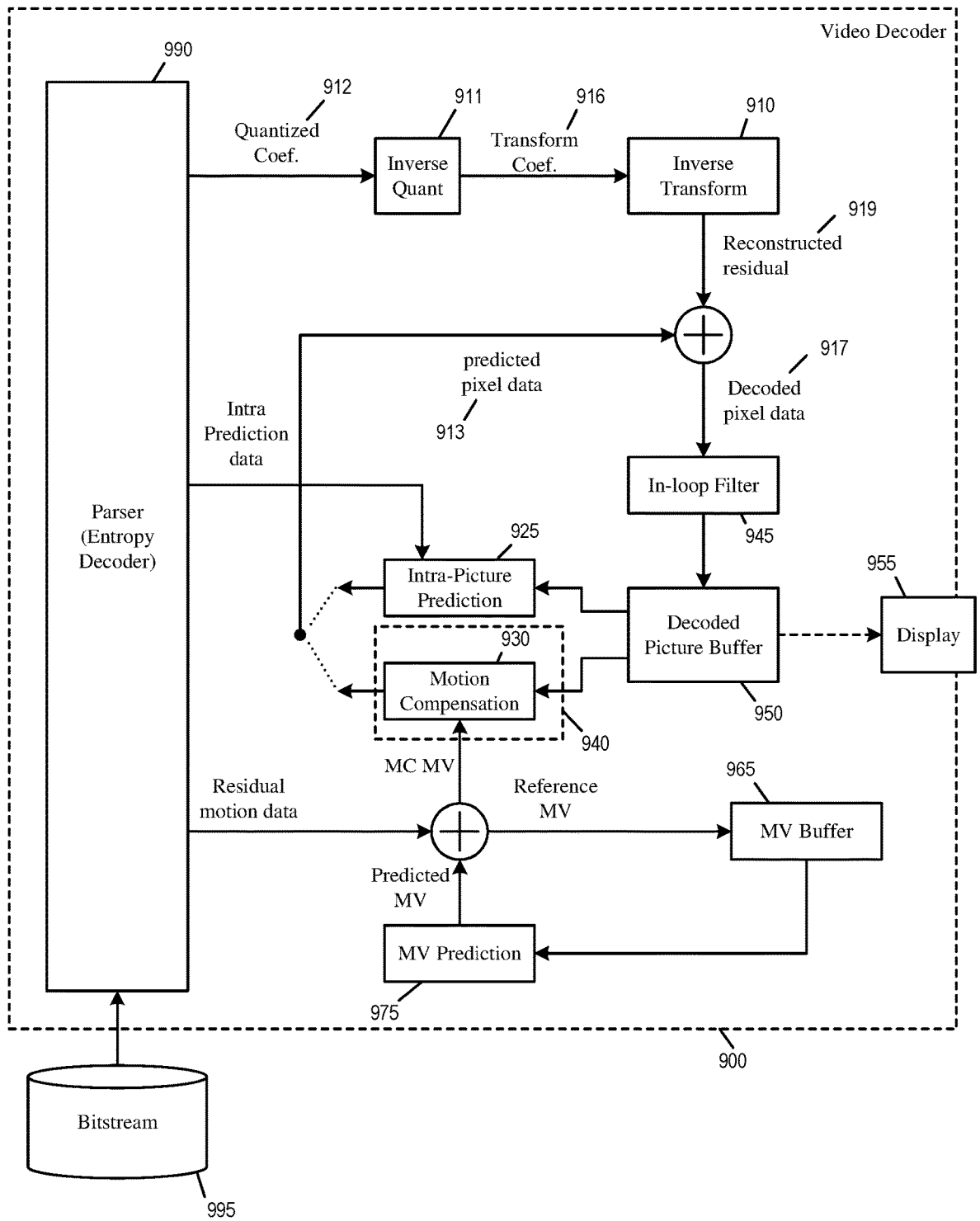
FIG. 9 illustrates an example video decoder that may implement sign hiding and dependent quantization.

FIG. 9 illustrates an example video decoder 900 that may implement sign hiding and dependent quantization. As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including some components selected from an inverse quantization module 911, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding.

The inverse quantization module 911 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly, or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
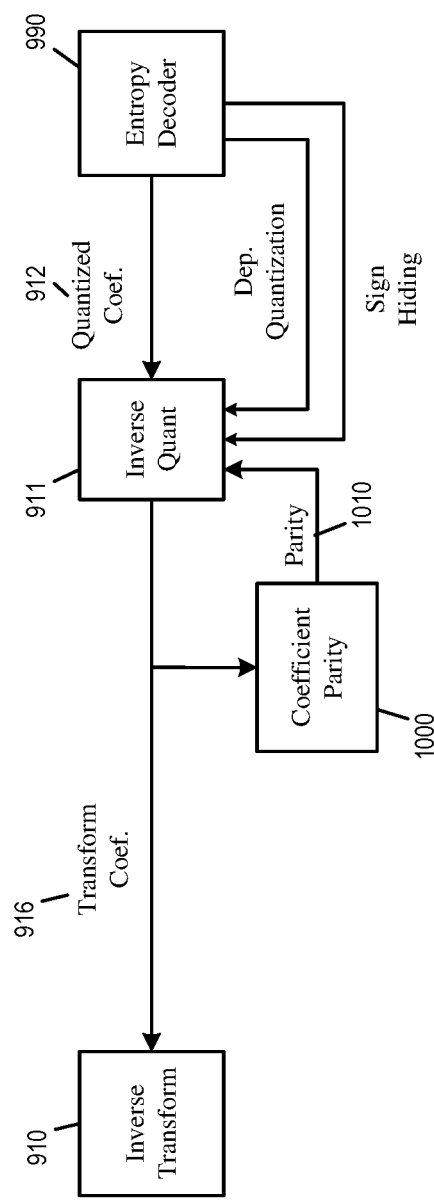
FIG. 10 illustrates portions of the video decoder that implement sign hiding and dependent quantization.

FIG. 10 illustrates portions of the video decoder 900 that implement sign hiding and dependent quantization. Specifically, the figure illustrates the components of the decoder 900 that parses, dequantizes, and inverse transforms coefficients from the bitstream 995. As illustrated, entropy decoder 990 provides quantized transform coefficients 912 parsed from the bitstream 995 to the inverse quantizer 911.

The entropy decoder 990 also parses the bitstream 995 for flags that indicate whether dependent quantization and/or sign hiding are enabled. In some embodiments, the dependent quantization and/or sign hiding flags are exclusively signaled, e.g., the flag for sign hiding is explicitly signaled only if the flag for dependent quantization indicates that dependent quantization is disabled, else sign hiding is inferred to be disabled. In some embodiments, the flags for dependent quantization and/or sign hiding are signaled at a sequence level (e.g., at a SPS) that are applicable to pictures in the sequence, and at a picture level (e.g., at a PH) that are applicable to slices of the picture.

The inverse quantizer 911 dequantizes the transform coefficients based on whether dependent quantization is enabled and whether sign hiding is enabled. When sign hiding is enabled, the sign bit of the first nonzero coefficient is not explicitly signaled in the bitstream but is inferred based on a parity 1010 of the sum of all nonzero coefficients in a coefficient subset (e.g., a 4×4 coding group) that is computed by a coefficient parity module 1000. When dependent quantization is enabled, the dequantization of a current transform coefficient is limited to a set of admissible values that are determined based on transform coefficients that precede the current transform coefficient in reconstruction order according to a trellis structure.

The inverse transform module 910 in turn receives the dequantized coefficients 916 provided by the inverse quantizer 911 and performs inverse transform to reconstruct the pixels data for a current block.

Figure 11:
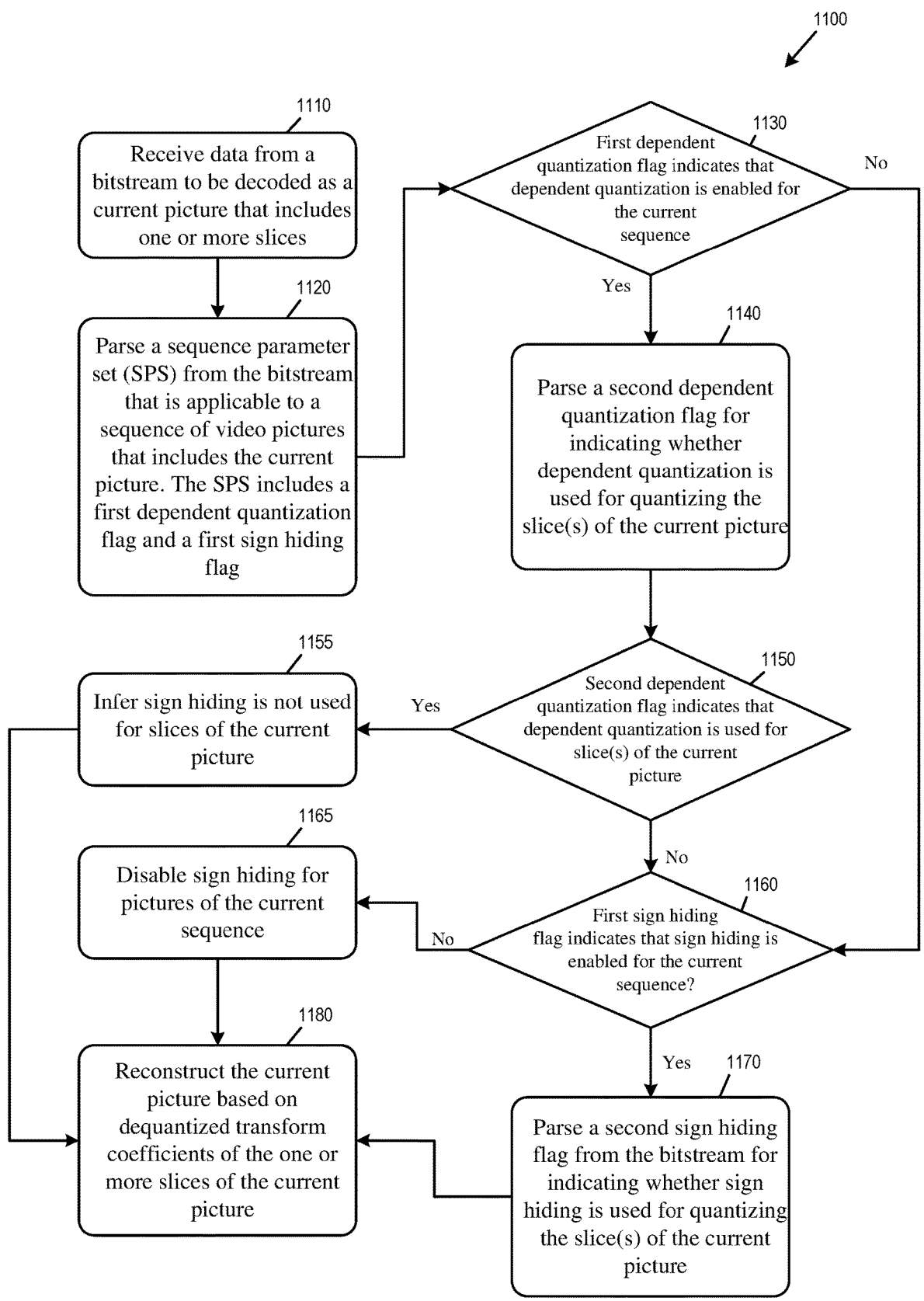
FIG. 11 conceptually illustrates a process that the video decoder uses for dependent quantization and sign hiding.

FIG. 11 conceptually illustrates a process 1100 that the video decoder 900 uses for dependent quantization and sign hiding. In some embodiments, one or more processing units (e.g., a processor) of a computing device implements the decoder 900 performs the process 1100 by executing instructions stored in a computer readable medium. In some embodiments, an electronic apparatus implementing the decoder 900 performs the process 1100.

The decoder receives (at block 1110) data from a bitstream to be decoded as a current picture having one or more slices.

The decoder (at block 1120) parses a sequence parameter set (SPS) from the bitstream that is applicable to a sequence of video pictures that includes the current picture. The SPS includes a first dependent quantization flag (e.g., sps_dep_quant_enabled_flag as shown in Table 4) and a first sign hiding flag (e.g., sps_sign_data_hiding_enabled_flag as shown in Table 4). In some embodiments, only one of dependent quantization and sign hiding is enabled for the one or more slices of the current picture. In other words, dependent quantization and sign hiding are exclusively signaled in the bitstream. In some embodiments, the first dependent quantization flag and the first sign hiding flag are exclusively signaled in the SPS, and the first sign hiding flag is not signaled in the SPS and inferred to disable sign hiding when the first dependent quantization flag is explicitly signaled in the SPS to enable dependent quantization.

The decoder determines (at block 1130) whether the first dependent quantization flag indicates that dependent quantization is enabled for the current sequence. If dependent quantization is enabled, the process proceeds to 1140. Otherwise, the process proceeds to 1160.

The decoder parses (at block 1140) a second dependent quantization flag (e.g., pic_dep_quant_enabled_flag shown in Table 5) from the bitstream for indicating whether dependent quantization is used for quantizing the one or more slices of the current picture. In some embodiments, the second dependent quantization flag is signaled in a picture header that is applicable to the one or more slices of the current picture.

The decoder determines (at block 1150) whether the second dependent quantization flag indicates that dependent quantization is used for one or more slices of the current picture. If dependent quantization is used, the process proceeds to block 1155. If dependent quantization is not used, the process proceeds to block 1160. When dependent quantization is used for the one or more slices of the current picture, a current transform coefficient in the one or more slices of the current picture is limited to a set of admissible (reconstruction) values that are determined based on transform coefficients that precede the current transform coefficient in reconstruction order according to a trellis structure. The transform coefficients of the one or more slices are quantized by a scaler quantizer that is determined by parities of the transform coefficients that precede the current transform coefficient in reconstruction order.

The decoder infers (at block 1155) sign hiding is to be disabled for the one or more slices of the current picture and the second sign hiding flag is not parsed. The process then proceeds to 1180.

The decoder determines (at block 1160) whether the first sign hiding flag indicates that sign hiding is enabled for the current sequence. If sign hiding is enabled for the current sequence, the process proceeds to block 1170. If sign hiding is not enabled for the current sequence, the process proceeds to 1165.

The decoder infers (at block 1165) sign hiding to be disabled for the one or more slices of the current picture and the second sign hiding flag is not parsed. The process then proceeds to 1180.

The decoder parses (at block 1170) a second sign hiding flag (e.g., sign_data_hiding_enable_flag shown in Table 5) from the bitstream for indicating whether sign hiding is used for quantizing the one or more slices of the current picture. In some embodiments, the second sign hiding flag is signaled in a picture header that is applicable to the one or more slices of the current picture. When sign hiding is used for quantizing the one or more slices of the current picture, a sign bit of a first non-zero transform coefficient of a coefficient subset in the one or more slices is determined based on a parity of a sum of all nonzero coefficients in the coefficient subset. The process then proceeds to block 1180.

The decoder reconstructs (at block 1180) the current picture based on dequantized transform coefficients of the one or more slices of the current picture. The transform coefficients are dequantized based on whether dependent quantization is used and whether sign hiding is used.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
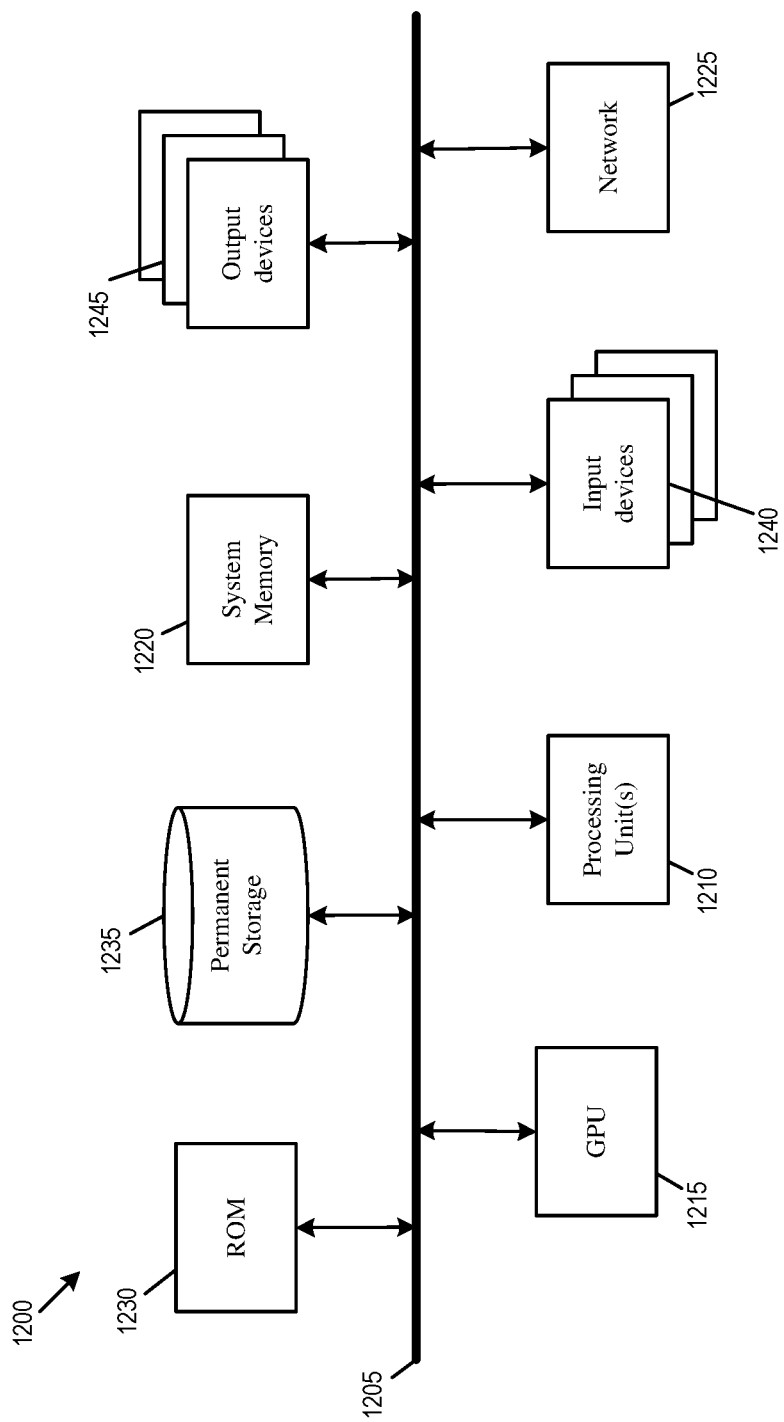
FIG. 12 conceptually illustrates an electronic system with which some embodiments of the present disclosure are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are used by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor uses at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alpha-numeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 8 and FIG. 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
    receiving data from a bitstream to be decoded as a current picture comprising one or more slices;
    determining a first dependent quantization flag and a first sign hiding flag according to at least one syntax element in a sequence parameter set (SPS) from the bitstream that is applicable to a current sequence of video pictures that includes the current picture, the first dependent quantization flag indicating whether dependent quantization is enabled for the current sequence, and the first sign hiding flag indicating whether sign hiding is enabled for the current sequence;
    when the first dependent quantization flag indicates that the dependent quantization is enabled for the current sequence, parsing a second dependent quantization flag from the bitstream, the second dependent quantization flag indicating whether the dependent quantization is used for quantizing the one or more slices of the current picture;
    when the second dependent quantization flag indicates that the dependent quantization is not used for the one or more slices of the current picture and the first sign hiding flag indicates that the sign hiding is enabled for the current sequence, parsing a second sign hiding flag from the bitstream, the second sign hiding flag indicating whether the sign hiding is used for quantization of the one or more slices of the current picture; and
    reconstructing the current picture based on transform coefficients of the one or more slices of the current picture, the transform coefficients being generated by dequantizing quantized coefficients of the one or more slices of the current picture based on whether the dependent quantization is used and whether the sign hiding is used as indicated by the first dependent quantization flag, the first sign hiding flag, the second dependent quantization flag if being parsed, and the second sign hiding flag if being parsed.

2. The video decoding method of claim 1, wherein when the second dependent quantization flag indicates that the dependent quantization is used for the one or more slices of the current picture, the sign hiding for the one or more slices of the current picture is inferred to be disabled and the second sign hiding flag is not parsed.

3. The video decoding method of claim 1, wherein when the first sign hiding flag indicates that the sign hiding is disabled for the current sequence, the sign hiding for the one or more slices of the current picture is inferred to be disabled and the second sign hiding flag is not parsed.

4. The video decoding method of claim 1, wherein none or only one of the dependent quantization and the sign hiding is used for the one or more slices of the current picture.

5. The video decoding method of claim 1, wherein when the sign hiding is used for the quantization of the one or more slices of the current picture, a sign bit of a first non-zero transform coefficient of a coefficient subset in the one or more slices is determined based on a parity of a sum of all nonzero coefficients in the coefficient subset.

6. The video decoding method of claim 1, wherein when the dependent quantization is used for quantizing the one or more slices of the current picture, a current transform coefficient in the one or more slices of the current picture is limited to a set of admissible values that are determined based on transform coefficients that precede the current transform coefficient in a reconstruction order of decoding the bitstream.

7. The video decoding method of claim 6, wherein the transform coefficients of the one or more slices are quantized by a scaler quantizer that is determined by parities of the transform coefficients that precede the current transform coefficient in the reconstruction order of decoding the bitstream.

8. The video decoding method of claim 1, wherein the second dependent quantization flag is signaled in a picture header that is applicable to the one or more slices of the current picture.

9. The video decoding method of claim 1, wherein the second sign hiding flag is signaled in a picture header that is applicable to the one or more slices of the current picture.

10. The video decoding method of claim 1, wherein
    only one of the first dependent quantization flag and the first sign hiding flag is signaled in the SPS applicable to the current sequence, and
    the first sign hiding flag is not signaled in the SPS applicable to the current sequence and is inferred to disable the sign hiding for the current sequence, when the first dependent quantization flag is explicitly signaled in the SPS to enable the dependent quantization for the current sequence.

11. A video encoding method, comprising:
    receiving raw pixel data to be encoded as a current picture comprising one or more slices into a bitstream;
    encoding into the bitstream a sequence parameter set (SPS) that is applicable to a current sequence of video pictures that includes the current picture, the SPS comprising at least one syntax element specifying a first dependent quantization flag and a first sign hiding flag, the first dependent quantization flag indicating whether dependent quantization is enabled for the current sequence, and the first sign hiding flag indicating whether sign hiding is enabled for the current sequence;
    when the first dependent quantization flag indicates that the dependent quantization is enabled for the current sequence, signaling a second dependent quantization flag in the bitstream, the second dependent quantization flag indicating whether the dependent quantization is used for quantizing the one or more slices of the current picture;
    when the second dependent quantization flag indicates that the dependent quantization is not used for the one or more slices of the current picture and the first sign hiding flag indicates that the sign hiding is enabled for the current sequence, signaling a second sign hiding flag in the bitstream, the second sign hiding flag indicating whether the sign hiding is used for quantization of the one or more slices of the current picture; and
    encoding, into the bitstream, quantized coefficients of the one or more slices of the current picture, the quantized coefficients being generated by quantizing transform coefficients of the one or more slices of the current picture based on whether the dependent quantization is used and whether the sign hiding is used as indicated by the first dependent quantization flag, the first sign hiding flag, the second dependent quantization flag if being signaled, and the second sign hiding flag if being signaled.

12. The video encoding method of claim 11, wherein none or only one of the dependent quantization and the sign hiding is used for the one or more slices of the current picture.

13. An electronic apparatus, comprising:
a video decoder circuit configured to:
  receive data from a bitstream to be decoded as a current picture comprising one or more slices;
  determine a first dependent quantization flag and a first sign hiding flag according to at least one syntax element in a sequence parameter set (SPS) from the bitstream that is applicable to a current sequence of video pictures that includes the current picture, the first dependent quantization flag indicating whether dependent quantization is enabled for the current sequence, and the first sign hiding flag indicating whether sign hiding is enabled for the current sequence;
  when the first dependent quantization flag indicates that the dependent quantization is enabled for the current sequence, parse a second dependent quantization flag from the bitstream, the second dependent quantization flag indicating whether the dependent quantization is used for quantizing the one or more slices of the current picture;
  when the second dependent quantization flag indicates that the dependent quantization is not used for the one or more slices of the current picture and the first sign hiding flag indicates that the sign hiding is enabled for the current sequence, parse a second sign hiding flag from the bitstream, the second sign hiding flag indicating whether the sign hiding is used for quantization of the one or more slices of the current picture; and
  reconstructing the current picture based on transform coefficients of the one or more slices of the current picture, the transform coefficients being generated by dequantizing quantized coefficients of the one or more slices of the current picture based on whether the dependent quantization is used and whether the sign hiding is used as indicated by the first dependent quantization flag, the first sign hiding flag, the second dependent quantization flag if being parsed, and the second sign hiding flag if being parsed.

14. The electronic apparatus of claim 13, wherein none or only one of the dependent quantization and the sign hiding is used for the one or more slices of the current picture.

* * * * *